United States Patent [19]

Weerstra

[11] Patent Number: 4,993,365

[45] Date of Patent: Feb. 19, 1991

[54] FLOW RATE METER AND AUTOMATIC ANIMAL FEEDER INSTALLATION EMPLOYING SUCH FLOW METER

[75] Inventor: Rienk Weerstra, Leeuwarden, Netherlands

[73] Assignee: Centrale Veevoederfabriek "Sloten" C.V., Deventer, Netherlands

[21] Appl. No.: 251,368

[22] Filed: Sep. 30, 1988

[30] Foreign Application Priority Data

Sep. 30, 1987 [NL] Netherlands ............. 8702329
Sep. 30, 1987 [NL] Netherlands ............. 8702330

[51] Int. Cl.⁵ ............. A01K 9/00; G01F 3/08
[52] U.S. Cl. ............. 119/71; 119/51.02; 73/195; 73/861.05
[58] Field of Search ............. 119/71, 72, 72.5, 51.02, 119/14.15, 14.16, 14.17; 73/195, 255, 861.05, 861.32, 197; 424/442

[56] References Cited

U.S. PATENT DOCUMENTS

| | | | |
|---|---|---|---|
| 3,524,432 | 8/1970 | Tartar | 119/71 X |
| 4,118,980 | 10/1978 | Debeaux | 73/861.05 |
| 4,343,191 | 8/1982 | Cairenius | 73/861.05 |
| 4,463,706 | 8/1984 | Meister et al. | 119/51.02 |
| 4,574,644 | 3/1986 | Lew et al. | 73/861.05 |

FOREIGN PATENT DOCUMENTS

| | | | |
|---|---|---|---|
| 3613887 | 10/1987 | Fed. Rep. of Germany | 119/71 |
| 0144704 | 11/1980 | German Democratic Rep. | 119/71 |
| 6602890 | 11/1967 | Netherlands | 119/71 |
| 0938856 | 6/1982 | U.S.S.R. | 119/51.02 |
| 1076048 | 2/1984 | U.S.S.R. | 119/71 |
| 2071340 | 9/1981 | United Kingdom | 73/861.05 |

*Primary Examiner*—Robert P. Swiatek
*Assistant Examiner*—Todd E. Manahan
*Attorney, Agent, or Firm*—Marvin Feldman

[57] ABSTRACT

A double flow rate meter (1) and an apparatus for automatically feeding animals with liquid food which utilizes the flow meter (1) for establishing the amount of food consumed is disclosed. The flow rate meter (1) comprises at least two circular flow passages (2, 20), each containing a ball (11, 12) constrained to be propelled through the relevant channel by fluid proportionally to the flow velocity of the fluid. The balls (11, 12) pass respective sensors (15, 16) in the flow passages. Each flow passage (11, 12) has its own inlet conduit (3, 5) and respective outlet conduit (21, 22), the outlet conduits merging into a single, common outlet conduit (4) leading to a nipple (37) or the like food dispensing means. The flow rate meter enables controlled feeding of an animal with liquid food while medicine or another compound can be administered simultaneously and proportionally to the supplied food. By using such flow meter (1) and control valves in the form of hose clamps (35, 36, 50) the entire system can be easily cleaned.

5 Claims, 3 Drawing Sheets

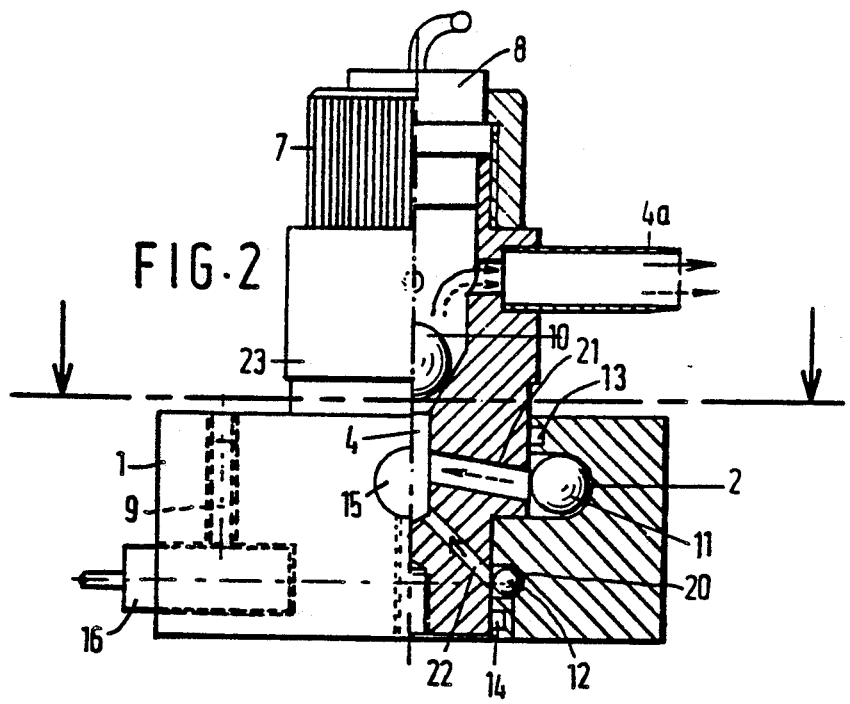
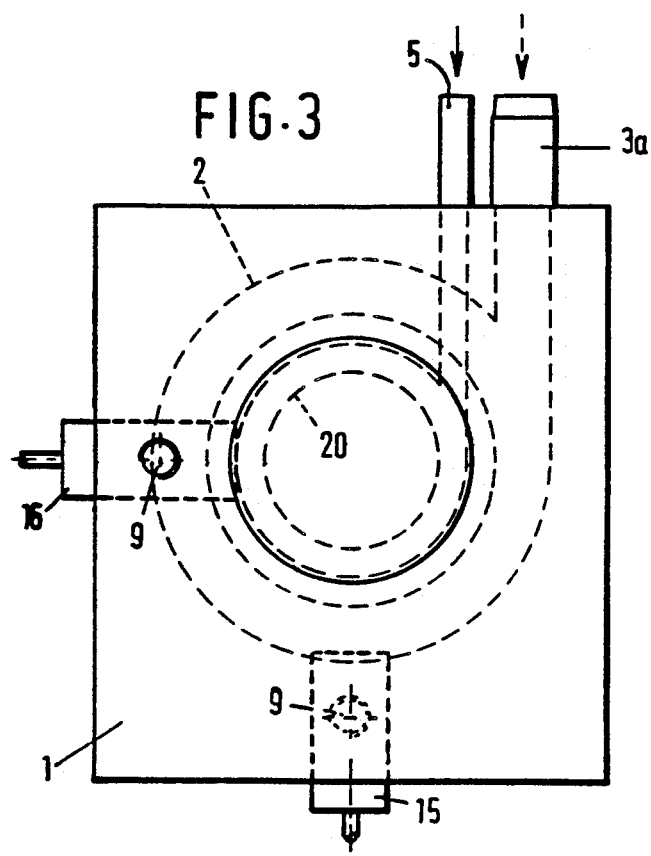

FLOW RATE METER AND AUTOMATIC ANIMAL FEEDER INSTALLATION EMPLOYING SUCH FLOW METER

The invention relates to a flow rate meter having a flow passage at least locally in the form of a circular channel along which a ball or like spherical indicator is constrained to be driven by a fluid proportionally to the flow velocity of the fluid, said ball thereby passing a sensor that signals the ball passages, a fluid inlet conduit opening substantially tangentially into said circular channel and an outlet conduit extending from the circular channel upstream adjacent the inlet opening and enclosing an angle with the said circular channel.

A flow rate meter of this kind is disclosed in GB-A-2,071,340. Because of its constructional simplicity and easy cleansability a flow rate meter of this kind is particularly suited for use in the food industry, in particular the dairy industry, for measuring a milk flow and the like.

In particular with an installation for automatically feeding animals, such as feeding calves with milk, it may be appropriate to add to a feed stream to be taken by an animal, another stream of, for example, medicinal compounds in an amount especially calculated for that particular animal.

An object of the invention is to provide a flow rate meter which is able to measure two or more fluid streams simultaneously and which, although not exclusively destined therefor, is particularly suited for application in such an automatic feeding installation.

To this end the flow rate meter according to the invention is characterized by more than one circular channel, each channel having its own ball, its own sensor, its own inlet conduit and the respective outlet conduits merging into a single, common outlet channel.

In use, pulses generated by the respective sensors may be transferred to a control unit which adjusts the respective supply pressures or controls the periods during which the respective supply line valves are opened, in order to maintain a certain mixing ratio.

The invention further concerns an apparatus for automatically feeding animals with liquid food, comprising at least one nipple or like food dispensing means, a supply conduit for supplying liquid food under pressure towards the nipple, a valve in said supply conduit controlled by means of a pressure sensor, so that when, due to sucking action of an animal exerted on the nipple, a pressure variation in the said supply conduit is sensed by the pressure sensor, the valve is opened, and flow rate measuring means being provided for establishing the amount of food consumed.

A similar installation is disclosed in NL-A-66,02890. In this known apparatus pressure variations caused by an animal are observed by means of a separate control circuit comprising a pressure measuring conduit branched off the supply line towards the nipple, as well as a vacuum operated switch for opening the valve in the feed supply line. Closing of the feed supply line valve takes place after a certain amount of prepared liquid feed has been used.

According to the invention it is possible to control the valve in the supply line to the nipple in a far simpler manner not only in the sense of opening this valve but also governing its closure after a predetermined amount of feed has been taken at the particular nipple.

To this end according to the invention a flow rate meter as earlier disclosed and provided with a check valve and a pressure sensor in the outlet channel, is mounted in the supply conduit, and the apparatus is further characterized in that the pressure sensor in the outlet channel and the ball passage sensor of the relevant circular channel of said flow rate meter are connected to a control unit which governs the valve.

In order to provide the possibility to add to the feed stream to a specific nipple a predetermined amount of other compounds, according to the invention the apparatus comprises an inlet conduit for a second fluid, such as a stream of medicinal compound or minerals, to be mixed proportionally with the food stream, said conduit being provided with a second valve and being connected to a second circular channel in said flow rate meter, said second circular channel having a second ball passage sensor also connected to said control unit, which is arragend to govern the second valve as well.

An embodiment of the flow meter and an embodiment of the feeding arrangement comprising such a flow meter, will now be described by way of example with reference to the accompanying drawings, in which:

FIG. 2 is a side-elevational view, partly in section, of a double flow meter according to the invention;

FIG. 3 is a plan view of the flow meter according to FIG. 2;

Figure 1:
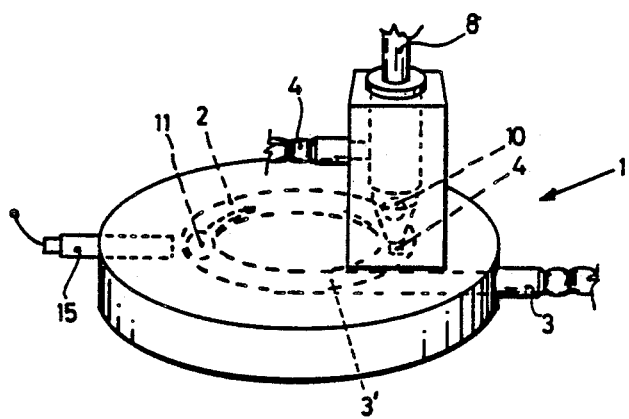
FIG. 1 shows schematically and in perspective view, a flow meter based on a known working principle.
Figure 1A:
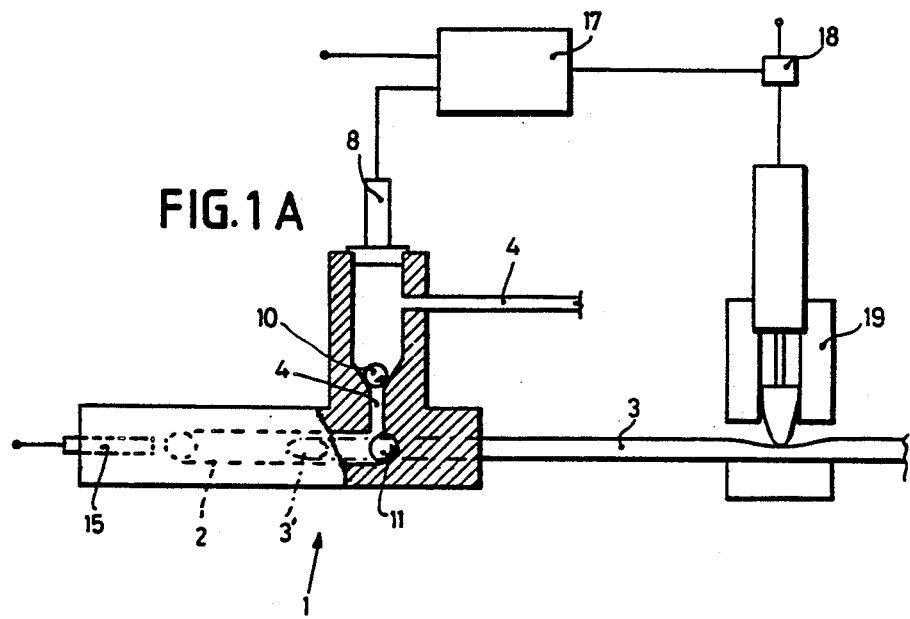
FIG. 1A shows the flow meter according to FIG. 1 in side elevational view with parts broken away, applied as a control means in a supply circuit.

According to FIG. 1 a flow meter of known general design comprises a housing 1 having a circular channel 2 therein, and a ball 11 of a diameter slightly less than the cross section of the annular channel is movable in this channel. An inlet channel 3 opens tangentially into the annular channel 2. An outlet channel 4 comprising a check valve 10 extends perpendicularly from the plane of the circular channel 2 from a place adjacent to, and upstream of, the inlet opening 3' in the circular channel 2.

Liquid supplied through the inlet conduit 3 and its opening 3' propels the ball 11 through the circular channel 2 before leaving the channel through conduit 4. The cyclic movement of the ball is sensed on each passage along sensor 15. Pulses generated by this sensor 15 can be transferred to a calculating unit (not shown) that calculates the liquid flow rate. Such pulses of the sensor 15 can also be supplied to a control unit 17 which through a magnetic valve 18 controls a hydraulic hose pinching means 19 in the supply line 3.

In the double channel embodiment of the flow rate meter according to FIGS. 2 and 3 the housing 1 comprises in addition to circular channel 2, a second circular channel 20. A ball 11 is movable in channel 2 and a second ball 12 is enclosed in channel 20.

A connecting nipple 3a for a supply line 3 is extended to open tangentially into circular channel 2. Connecting nipple 5 for the supply of a second fluid is extended by a conduit tangentially opening into the second circular channel 20. The circular channels 2 and 20 are each provided with an outlet conduit 21, 22 respectively, which outlet conduits extend in planes radially oriented to the circular channels 2 and 20, said outlet conduits open into an axial outlet channel 4 connected to a nipple 4a for a common outlet line.

A sensor 15 is provided for passages of ball 11 in circular channel 2 and a sensor 16 is provided for sensing the passages of ball 12 in circular channel 20. The sensors 15 and 16 are releasably fixed by screws 9 in housing 1. Further a pressure sensor 8 is shown in FIG. 2 mounted by means of a cap nut 7.

As appears from FIGS. 2 and 3 the flow meter is built up out of parts that are easy to manufacture. Housing 1 can be made by injection molding of a synthetic resin provided with a central passage having circular grooves 2 and 20 in the side walls as well as blind holes for accepting the sensors 15 and 16 and through holes taking up the screws 9 and further provided with connecting nipples 3a and 5.

A core 23 having therein outlet conduits 21 and 22, may be manufactured by injection molding as well. After positioning of the balls 11 and 12 into the relevant grooves the core 23 can be fixed into the housing 1 and sealed by means of O-rings 13 and 14. The pressure sensor 8 can be mounted by means of cap nut 7 and after connection of the respective inlet and outlet hoses and electrical leads at the sensors 15 and 16, the flow rate meter is ready for use.

Figure 4:
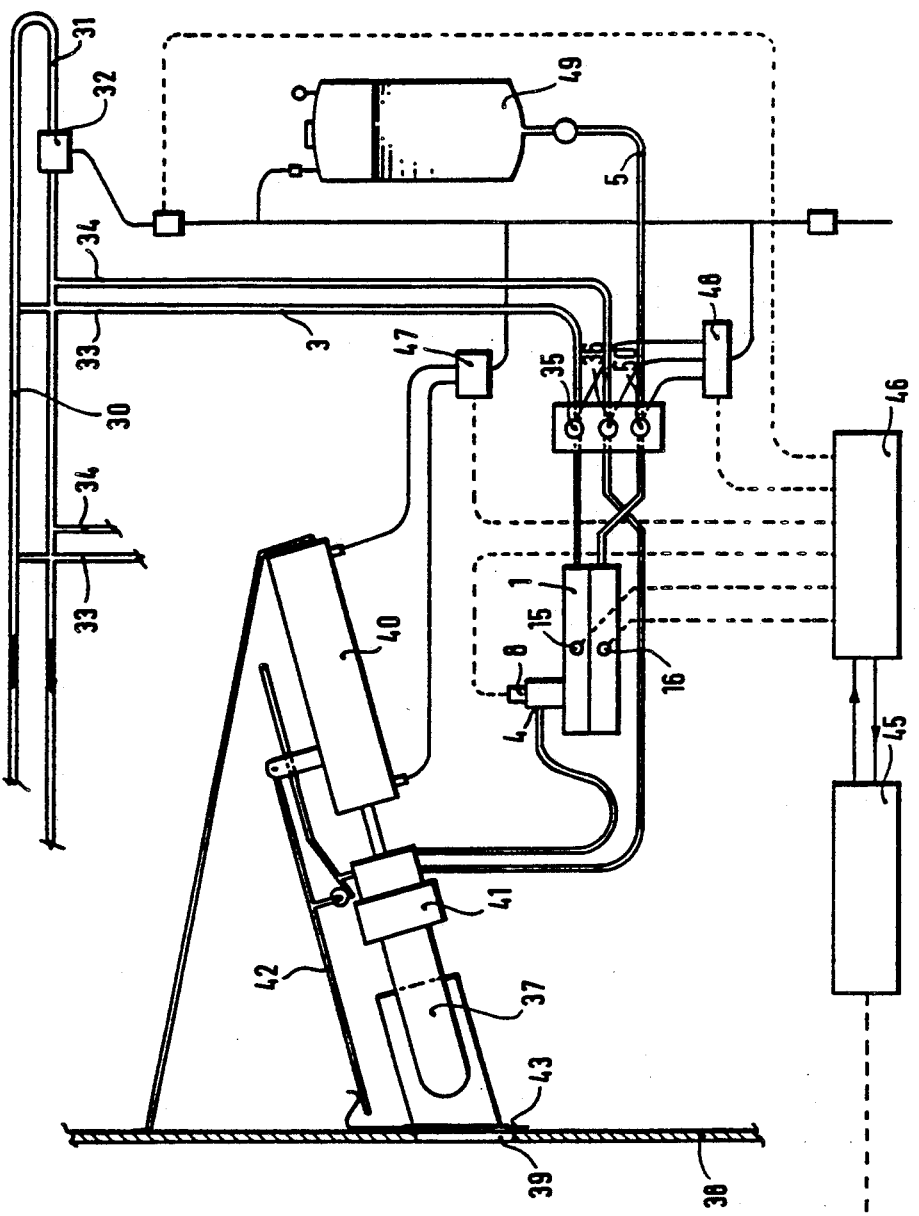
FIG. 4 shows schematically part of an automatic feed installation wherein use is made of the flow meter according to the invention.

In the automatic feeding installation according to FIG. 4 liquid food is prepared in a central kitchen (not shown) by mixing food in powder form in a blender usually at a temperature of 65° to 80° C., after which the correct drinking temperature and the correct concentration of the food is attained by adding cold water.

In the central kitchen a buffer tank is situated next to the blender, said tank being provided with means for keeping the contents at a constant temperature, for example 20° to 40° C., as well as stirring means and an adjustable minimum level detector. Controlled by this minimum level detector the contents of the buffer tank can be replenished batchwise from the blender. A circulation system 30 is connected to the buffer tank and to spaced drinking stations for several groups of animals.

The so-called end loop 31 of this circulation system 30 is provided with a remote control valve 32 which normally is in the open position.

The conduits to and from valve 32 are substantially parallel and are at a drinking station provided with a branching to which the supply hose or the like conduit 33 and a outlet hose or the like conduit 34 are connected. Both hoses are normally closed by air-controlled hose clamps 35, 36. The circulation flow rate and the pressure in the circulation system are selected so that when the supply to a nipple is opened, irrespective of the drinking rate of the calf, supply to the nipple 37 takes place without any sucking action.

The drinking station is further designed so that calves of any size may drink without hinder from other calves in the shed.

In the installation according to the invention, behind the forefront 38 having an opening 39 a nipple holder 41 movable by an air cylinder 40 and a nipple 37 are arranged. In the so-called rest position (the position wherein the nipple is retracted), the front opening 39 is closed by a flap 43 controlled by rod means 42 and the air cylinder.

The drinking position is initiated when a calf visits a drinking station, is recognized by a transponder-transmitter system 44 and is still allowed some food. When this has been established a signal transducer 45 gives information to a control unit 46. By shifting an air valve 47 air cylinder 40 is actuated and the nipple holder 41 reaches the so-called drinking position so that the calf can take the nipple 37 into its mouth. Preferably, the nipple is placed at a certain angle and at a certain level, such that the position of the nipple is always parallel to the palate of the calf. In this way the nipple is prevented from being bent, which would prevent proper filling.

The milk supply through supply hose 33 and hose clamp 35 remains initially closed. Only when the calf has taken the nipple and after the pressure sensor 8 has detected a pressure variation due to swallow reflexes, the hose clamp 35 is opened through the control unit 46 and a magnet valve 48. Because the supply pressure prevails in circulation conduit 30 the nipple is immediately filled with liquid feed through the flow meter 1.

If, and as long as, the calf accepts food, which is continuously detected by the pressure sensor 8, the supply of food to the nipple 37 remains open. The amount of accepted food is measured by the flow rate meter 1 and the relevant data are transmitted through the control unit 46 to the signal processing device 45. When the amount of food prescribed for a certain period of time has been consumed the supply is closed and after a certain delay the nipple holder 41 returns to the inactive position.

As mentioned earlier, together with feeding, a certain calf medicine and/or a mineral solution can be administered simultaneously and proportionally to the supplied food. This solution is delivered from a stainless steel tank 49 in which the pressure fluctuates. The hose clamp 50 that has to be opened for such additional supply, is then controlled by the signal processing device 45 through the control unit 46. The amount passed through the nipple is then measured by means of the same flow rate meter 1 and the data are transmitted to the signal processing device. The flow meter is of the double circular channel type depicted in FIGS. 2 and 3.

An important advantage of the installation according to the invention is that cleaning of the entire system is easily performed automatically. To this end the circulation conduit valve 32 is closed and the hose clamps in the supply 35 and the return 36 conduits, respectively, are opened. The circulation with preflushing water, detergent and rinsing water now takes place over the nipple 37. If also the front opening 39 has been closed by flap 43, any water leaking through the opening in the nipple cannot reach a calf standing in the drinking station.

We claim:

1. A flow rate meter having a flow passage at least locally in the form of at least one circular channel within which a ball is constrained in said at least one circular channel to be driven by a fluid in proportion to the flow velocity of the fluid, said ball thereby passing a sensor that signals the ball revolutions, and said flow passage being formed with a fluid inlet conduit opening substantially tangentially into said at least one circular channel and an outlet conduit extending from the at least one circular channel upstream of, and adjacent to, the inlet opening and forming an angle with the said at least one circular channel; further there being more than one circular channel, each channel having its own ball, its own sensor, its own inlet conduit and its own outlet conduit; the outlet conduits of the circular channels merging into a single, common outlet channel.

2. The flow rate meter according to claim 1, further comprising means for transmitting pulses generated by respective sensors to a control unit which governs control valves in respective supply lines connected to the inlet conduits of the circular channels; the supply lines extending towards the flow rate meter.

3. The flow rate meter according to claim 1 or 2, further comprising a check valve and a pressure sensor in the common outlet channel.

4. An apparatus for automatically feeding animals liquid food, comprising at least one nipple, a supply conduit for supplying liquid food under pressure towards the nipple, said supply conduit having a valve controlled by a pressure sensor therein so that when, due to sucking action of an animal exerted on the nipple, a pressure variation in the said supply conduit is sensed by the pressure sensor, the valve is opened; and a flow rate meter for establishing the amount of food consumed, located between the valve and the nipple said flow rate meter having at least one flow passage; each flow passage being at least locally in the form of at least one circular channel within which a ball is constrained in said at least one circular channel to be driven by a fluid in proportion to the flow velocity of the fluid, said ball thereby passing a sensor that signals the ball revolutions, and each flow passage being formed with a fluid inlet conduit opening substantially tangentially into said at least one circular channel and an outlet conduit extending from said at least one circular channel upstream of, and adjacent to the inlet opening and forming an angle with the said at least one circular channel, further there being more than one circular channel, each channel having its own ball, its own sensor, its own inlet conduit and its own outlet conduit; the outlet conduits of the circular channels merging into a single, common outlet channel.

5. The apparatus according to claim 4, further comprising an inlet conduit for a second fluid to be mixed proportionally with the liquid food, said conduit being provided with a second valve, and being connected to a second circular channel in said flow rate meter, the ball passage sensor of said second circular channel being connected to said control unit, which is arranged to additionally govern the second valve.

* * * * *